(12) United States Patent
Morris et al.

(10) Patent No.: US 9,701,881 B2
(45) Date of Patent: Jul. 11, 2017

(54) OIL ABSORBENT OILFIELD MATERIALS AS ADDITIVES IN OIL-BASED DRILLING FLUID APPLICATIONS

(75) Inventors: Kay Ann Morris, Kingwood, TX (US); Matthew Lynn Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 858 days.

(21) Appl. No.: 13/527,588

(22) Filed: Jun. 20, 2012

(65) Prior Publication Data

US 2013/0345098 A1 Dec. 26, 2013

(51) Int. Cl.
| | | |
|---|---|---|
| C09K 8/34 | (2006.01) | |
| C09K 8/03 | (2006.01) | |
| C09K 8/035 | (2006.01) | |
| C04B 28/02 | (2006.01) | |
| C09K 8/467 | (2006.01) | |

(52) U.S. Cl.
CPC .............. *C09K 8/032* (2013.01); *C04B 28/02* (2013.01); *C09K 8/035* (2013.01); *C09K 8/34* (2013.01); *C09K 8/467* (2013.01)

(58) Field of Classification Search
None
See application file for complete search history.

(56) References Cited

U.S. PATENT DOCUMENTS

| | | | |
|---|---|---|---|
| 4,233,162 A * | 11/1980 | Carney | C09K 8/22 507/108 |
| 4,425,462 A | 1/1984 | Turner et al. | |
| 4,633,950 A | 1/1987 | Delhommer et al. | |
| 4,704,213 A | 11/1987 | Delhommer et al. | |
| 4,740,319 A | 4/1988 | Patel et al. | |
| 5,883,054 A | 3/1999 | Hernández et al. | |
| 5,993,372 A | 11/1999 | Holland | |
| 6,110,874 A | 8/2000 | Van Slyke | |
| 6,887,832 B2 | 5/2005 | Kirsner et al. | |
| 7,026,272 B2 | 4/2006 | Reddy et al. | |
| 7,278,485 B2 | 10/2007 | Kirsner et al. | |
| 7,456,135 B2 | 11/2008 | Kirsner et al. | |
| 7,462,580 B2 | 12/2008 | Kirsner et al. | |
| 7,488,704 B2 | 2/2009 | Kirsner et al. | |
| 7,534,743 B2 | 5/2009 | Kirsner et al. | |
| 7,547,663 B2 | 6/2009 | Kirsner et al. | |
| 7,645,723 B2 | 1/2010 | Kirsner et al. | |
| 7,687,571 B2 | 3/2010 | Vaidya et al. | |
| 7,690,429 B2 * | 4/2010 | Creel et al. | 166/300 |
| 7,717,180 B2 * | 5/2010 | Badalamenti et al. | 166/292 |
| 7,866,393 B2 | 1/2011 | Badalamenti et al. | |
| 8,141,661 B2 | 3/2012 | Kakadjian et al. | |
| 8,193,124 B2 | 6/2012 | Mettath et al. | |
| 2006/0122071 A1 * | 6/2006 | Reddy | C09K 8/5045 507/219 |
| 2007/0137528 A1 | 6/2007 | Le Roy-Delage et al. | |
| 2009/0258800 A1 * | 10/2009 | Halliday | C09K 8/16 507/140 |
| 2010/0298175 A1 * | 11/2010 | Ghassemzadeh | C09K 8/5045 507/124 |
| 2010/0311619 A1 * | 12/2010 | Mettath et al. | 507/120 |
| 2011/0160096 A1 * | 6/2011 | Roddy | G06F 19/322 507/100 |

FOREIGN PATENT DOCUMENTS

| | | | | |
|---|---|---|---|---|
| WO | 9805733 A1 | 2/1998 | | |
| WO | WO 2011038861 A2 * | 4/2011 | | C09K 8/40 |

OTHER PUBLICATIONS

Sverre Anderssen, Swell Technology, slide presentation, Feb. 2007, twenty pages, Halliburton.
Swellpacker® Isolation System brochure, Feb. 2011, three pages, H07827, Halliburton.
International Search Report and Written Opinion in related PCT Application No PCT/US2013/032731, mailed on Jul. 3, 2013 (11 pages).
International Preliminary Report on Patentability in related PCT Application No. PCT/US2013/032731, mailed on Dec. 31, 2014 (9 pages).
Official Communication issued in related European application No. 13721422.7, mailed on Jan. 27, 2015 (2 pages).
Examination Report issued in related Australian application No. 2013277767, mailed on Dec. 24, 2014 (3 pages).
Examination Report issued in related Australian application No. 2013277767, mailed on Nov. 11, 2015 (5 pages).

* cited by examiner

*Primary Examiner* — Alicia Bland
(74) *Attorney, Agent, or Firm* — Tenley Krueger; Baker Botts L.L.P.

(57) ABSTRACT

A method using a single additive to modify or enhance one or more properties of a drilling fluid for drilling a wellbore in a subterranean formation, prevent lost circulation during the drilling, and/or increase bonding strength during cementing of the wellbore. The additive comprises an oil absorbent material comprising homopolymers or copolymers comprising styrene butadiene, acrylate, phthalate, and carbonate salts.

11 Claims, No Drawings

US 9,701,881 B2

OIL ABSORBENT OILFIELD MATERIALS AS ADDITIVES IN OIL-BASED DRILLING FLUID APPLICATIONS

BACKGROUND OF THE INVENTION

1. Field of the Invention

The present invention relates generally to the field of oilfield exploration, production, and testing, and more specifically to additives for oil-based drilling fluids for filtration control, suspension, lubrication and lost circulation, and their uses in such applications.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation.

Specific drilling fluid systems are selected to optimize a drilling operation in accordance with the characteristics of a particular geological formation. Oil based muds are normally used to drill swelling or sloughing shales, salt, gypsum, anhydrite and other evaporate formations, hydrogen sulfide-containing formations, and hot (greater than about 300 degrees Fahrenheit ("° F.") holes, but may be used in other holes penetrating a subterranean formation as well.

An oil invert emulsion-based drilling fluid may commonly comprise between about 50:50 to about 95:5 by volume oil phase to water phase. Such oil-based muds used in drilling typically comprise: a base oil comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Invert emulsion-based muds or drilling fluids (also called invert drilling muds or invert muds or fluids) comprise a key segment of the drilling fluids industry.

When drilling wellbores in hydrocarbon-bearing formations to recover hydrocarbons worldwide, there is a continuing and growing desire to enhance efficiencies. Minimizing the number of different additives needed for a drilling fluid and minimizing the variation in such additives from well to well, field to field, country to country, is helpful in realizing the efficiency goal. Preventing loss of drilling fluid is also important. Many times, wells are drilled through lost circulation-prone zones prior to reaching a potential producing zone, requiring use of lost circulation materials to reduce losses of drilling fluids in such zones. Typical lost circulation materials for drilling operations, however, have been directed to water-based solutions.

Increasingly, invert emulsion-based drilling fluids are being subjected to ever greater performance and cost demands as well as environmental restrictions. Consequently, there is a continued need and industry-wide interest in new drilling fluids and additives that provide improved performance while still affording environmental and economical acceptance.

SUMMARY OF THE INVENTION

The present invention provides a method for modifying or enhancing one or more properties of a drilling fluid used in drilling a wellbore in a subterranean formation for the recovery of hydrocarbons. According to the method, an oil absorbing material is used with the drilling fluid, particularly an oil or invert emulsion based fluid, as a viscosifier, rheology modifier, suspension agent and/or filtration control agent. The oil absorbing material may also be used to minimize mud losses by gelling at a desired location in the formation. The oil absorbing material may also be added prior to or with cement or during cementing of the wellbore, to absorb any excess oil and enhance the bond strength of the casing. Although the focus of the invention is with the oil absorbing material as an additive to oil based drilling fluid, the oil absorbing material may also increase lubricity of an aqueous based drilling fluid.

DETAILED DESCRIPTION OF PREFERRED EMBODIMENTS

The present invention meets the need of enhancing efficiency of oil well drilling and completion by providing an oil absorbent material having global utility for a variety of functions in drilling and completing wellbores in subterranean formations. In one embodiment, the oil absorbent material of the invention is a homopolymer or copolymer comprising styrene, butadiene, acrylate, phthalate, and carbonate salts. In another embodiment, the oil absorbent material comprises homopolymers or copolymers comprising styrene butadiene, acrylate, phthalate, and/or carbonate salts. In another embodiment, the oil absorbent material is an elastomeric polymer comprising isoprene, isobutylene, ethylene, acrylonitrile, hydrogenated nitrile, norbornene, fluorinated, perfluorinated, ether block amides, or the halogenated congeners of any of these above listed materials. Commercially available oil absorbent materials that may be used in the invention include: NORSOREX® APX1, available from Astrotech in Vienna, Austria; ENVIRO-BOND® 403, available from Petroleum Environmental, L.L.C. in Rapid City, Mich.; A610, A611, A650, available from Nochar Inc. in Indianapolis, Ind.; PETROBOND™ N-910, N-990, also available from Nochar Inc. in Indianapolis, Ind.; WASTE-SET™ 3200, 3400, available from Environmental and Fire Technology, L.L.C. in Grand Rapids, Mich.

According to the invention, the oil absorbent material may be added to the drilling fluid as a viscosifier and/or a suspension agent, and/or as a rheology modifier that can increase low end rheological properties. Low end rheology corresponds to shear rates of 10.2 sec−1 or less on a Fann 35A rheometer with a R1 rotor and B1 bob at 6 rpm. The oil absorbent material may further be used to maintain suitable viscosity of the drilling fluid during transportation. That is, the oil absorbent material may be used to impart a higher viscosity to the drilling fluid for transport and then may be depleted so as to allow the drilling fluid to have a lower viscosity for use as a drilling fluid. This rheology modification for transport may also help the drilling fluid maintain suspension of solids until the time of use as a drilling fluid.

The oil absorbent material may also be used according to the invention as a lost circulation material. In one embodiment, the oil absorbent material may be deployed in a pill or spacer at concentrations sufficiently high as to provide a firm, non-flowable gelled matrix in the treated zone of the subterranean formation. The oil absorbent material can form a completely gelled matrix in as little as about 30 seconds or can take 5 hours or more to completely form a gelled matrix, depending on the concentrations of the oil absorbent material added. For gelation, the oil absorbent material may be used with linear, cyclic, aliphatic, aromatic, olefinic, or esterified base oils. In another embodiment, the oil absorbent material may be deployed as an aqueous dispersion to the desired location in the subterranean formation and then chased with a suitable base oil for gelation at that location for a rapid set and to provide a type of reverse gunk squeeze.

The oil absorbent material of the invention may further be used in cementing a well drilled with oil based fluid. According to the invention, the oil absorbent material is used prior to addition of cement or with cement to absorb excess oil down hole and to increase the bond strength between the formation and the casing in completing the well. As used herein, the term "cementing" shall be generally understood to include operations for casing a borehole as well as operations for cementing a borehole unless stated otherwise.

EXPERIMENTAL

Tests of an oil absorbent material with commonly used base oils for drilling fluids were conducted to determine the effect and compatibility. Mixtures of 1 g Nochar A610 oil absorbent material were prepared with 40 ml of each of the following base oils: ENCORE® isomerized olefin base oil, available from Halliburton Energy Services, Inc. in Houston, Tex. and Duncan, Okla., ACCOLADE® ester/internal olefin blend oil, available from Halliburton Energy Services, Inc. in Houston, Tex., ESCAID® 110 dearomatized light hydrocarbon oil, available from ExxonMobil in Houston, Tex., SARALINE® 185V synthetic oil, available from Shell in Houston, Tex., and diesel. A non-flowable gel formed with the ENCORE® sample, with some syneresis. Different concentrations were then tested, specifically, 3.5 g of Nochar A610 additive in 50 ml of ENCORE® oil and 1.0 g of Nochar A610 additive in 35 ml of ENCORE® oil, simulating >25 lb/bbl to 10 lb/bbl. A concentration of 1.0 g of Nochar A 610 additive in 40 ml of ENCORE® oil, simulating 9 lb/bbl was also tested. A firm, non-flowable gel was formed at concentrations ranging from 25 lb/bbl to 10 lb/bbl. The gel structure formed at 9 lb/bbl but with syneresis.

Tests with Nochar A611 at 70 lb/bbl indicated that the oil absorbent material increased the viscosity of the oils, namely ENCORE® base oil, ACCOLADE® base oil and diesel, at room temperature. The oils continued to increase in viscosity over time to form only slightly flowable gels. Nochar A611 formed a transparent gel at a slower rate than Nochar A610 at room temperature. For example, Nochar A610 at 23 lb/bbl concentration in a base oil formed a flexible gel in less than one minute, while Nochar A611 at 23 lb/bbl concentration in a base oil formatted a flowable gel after greater than thirty minutes. Thus, the time for a desired degree of gelation may be tuned to account for temperature by using a mixture, such as a mixture of both Nochar A610 and A611 in this example.

Oil based mud (OBM) or drilling fluid was prepared according to the following composition in Table 1 resulting in a 13.6 lb/gal OBM. The water phase salinity for the calcium chloride brine used was 250,000 ppm. Nochar A611 was added at varying concentrations ranging from 4 to 9 lb/bbl. The rheology and gel strengths of the prepared samples A-C were then tested.

TABLE 1

Oil Based Mud Compositions with Oil Absorbant Additive

| SAMPLE | OBM | A | B | C |
|---|---|---|---|---|
| Mineral oil, bbl | 0.52 | 0.52 | 0.52 | 0.52 |
| Emulsifier, lb/bbl | 10 | 10 | 10 | 10 |
| Lime, lb/bbl | 1 | 1 | 1 | 1 |
| Calcium chloride brine, bbl | 0.20 | 0.20 | 0.20 | 0.20 |
| Filtration Control Agent, lb/bbl | 2 | 2 | 2 | 2 |
| Suspension Agent, lb/bbl | 1 | 1 | 1 | 1 |
| Nochar A611, lb/bbl | — | 4 | 6 | 9 |
| Barite, lb/bbl | 324.1 | 324.1 | 324.1 | 324.1 |
| WPS, ppm | 250,000 | 250,000 | 250,000 | 250,000 |
| Fluid Density, lb/gal | 13.6 | 13.6 | 13.6 | 13.6 |

TABLE 2

Fann 35 Rheology at 120° F. and Gel Strength Data

| SAMPLE | OBM | A | B | C |
|---|---|---|---|---|
| 600 rpm | 30 | 141 | 172 | 232 |
| 300 rpm | 17 | 89 | 110 | 132 |
| 200 rpm | 12 | 70 | 86 | 96 |
| 100 rpm | 8 | 48 | 60 | 57 |
| 6 rpm | 2 | 12 | 22 | 13 |
| 3 rpm | 1 | 9 | 18 | 10 |
| Plastic Viscosity, cP | 13 | 52 | 62 | 100 |
| Yield Point, lb/100 ft$^2$ | 4 | 37 | 48 | 32 |
| Tau 0 | 0 | 6 | 14 | 7 |
| 10 s/10 m gel | 2/2 | 15/16 | 19/21 | 12/14 |

The rheology of the base OBM of Table 1, as shown in Table 2, was poor, with ineffective suspension of the barite and no gel strength, leading to barite settling, without addition of any additive according to the present invention. The viscosity of Sample A, which contained 4 lb/bbl of Nochar A611 according to the invention, significantly increased to provide an OBM with improved solids suspension. Samples B and C containing 6 and 9 lb/bbl of Nochar A611, respectively, according to the invention, further modified the rheology by increasing the overall fluid viscosity. Nochar A611 readily viscosified the OBM. However, the gel strengths of each sample remained relatively flat despite the fluid viscosity increase.

A representative ship out synthetic based fluid (SBF) or ship out drilling fluid was prepared according to the following compositions in Table 3 using a water phase salinity of 280,000 ppm for the calcium chloride brine, which gave a fluid density of 10.1 lb/gal. Nochar A611 was added at concentrations ranging from 0.5 to 2 lb/bbl. The rheology and gel strengths of the prepared samples D-F were then tested using a Fann 35 viscometer.

TABLE 3

Representative Ship Out Synthetic Based Mud Compositions with Oil Absorbant Additive

| SAMPLE | SBF | D | E | F |
|---|---|---|---|---|
| Internal olefin base fluid, bbl | 0.60 | 0.60 | 0.60 | 0.60 |
| Emulsifier, lb/bbl | 6 | 6 | 6 | 6 |
| Lime, lb/bbl | 1 | 1 | 1 | 1 |

TABLE 3-continued

Representative Ship Out Synthetic Based Mud
Compositions with Oil Absorbant Additive

| SAMPLE | SBF | D | E | F |
|---|---|---|---|---|
| Calcium chloride brine, bbl | 0.28 | 0.28 | 0.28 | 0.28 |
| Filtration Control Agent, lb/bbl | 2 | 2 | 2 | 2 |
| Suspension Agent, lb/bbl | 1 | 1 | 1 | 1 |
| Nochar A611, lb/bbl | — | 0.5 | 1 | 2 |
| Barite, lb/bbl | 121.0 | 121.0 | 121.0 | 121.0 |
| WPS, ppm | 280,000 | 280,000 | 280,000 | 280,000 |
| Fluid Density, lb/gal | 10.1 | 10.1 | 10.1 | 10.1 |

TABLE 4

Fann 35 Rheology at 120° F. and Gel Strength
Data for Ship Out Fluid

| SAMPLE | SBF | D | E | F |
|---|---|---|---|---|
| 600 rpm | 64 | 73 | 83 | 105 |
| 300 rpm | 43 | 49 | 56 | 70 |
| 200 rpm | 33 | 41 | 45 | 58 |
| 100 rpm | 24 | 30 | 34 | 42 |
| 6 rpm | 8 | 11 | 12 | 15 |
| 3 rpm | 6 | 8 | 10 | 12 |
| Plastic Viscosity, cP | 21 | 24 | 27 | 35 |
| Yield Point, lb/100 ft$^2$ | 22 | 25 | 29 | 35 |
| Tau 0 | 4 | 5 | 8 | 9 |
| 10 s/10 m/30 m gel | 7/8/9 | 9/9/11 | 9/9/10 | 11/11/12 |

The synthetic based fluid samples were aged while rolling at 150° F. for 16 hours. The viscosity of compositions D-F increased with respect to the synthetic based fluid formulation with increasing A611 concentration (Table 4). The Tau 0 value also increased with increased A611 concentrations thus providing further indication of the viscosity increase. However, the fluid viscosity increase was attained within 2 hours after A611 addition as there was not a significant viscosity change when comparing the base samples to the aged samples. The gel strengths remained flat in the formulations containing A611, which could help maintain the viscosity profile over time during transportation.

The exemplary additives disclosed herein are not expected to have any direct or indirect effect on equipment associated with the preparation, delivery, recapture, recycling, reuse, and/or disposal of the disclosed additives. The disclosed additives are also not expected to have any direct or indirect effect on any transport or delivery equipment used to convey the additives to a well site or downhole. The disclosed additives are also not expected to directly or indirectly affect the various downhole equipment and tools that may come into contact with the additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The foregoing description of the invention is intended to be a description of preferred embodiments. Various changes in the details of the described fluids and methods of use can be made without departing from the intended scope of this invention as defined by the appended claims.

What is claimed is:

1. A method for modifying or enhancing one or more properties of a drilling fluid for drilling a wellbore in a subterranean formation, preventing lost circulation during the drilling, and/or increasing bonding strength during cementing of the wellbore, the method comprising adding to the drilling fluid an additive consisting of an oil absorbent material and drilling with the drilling fluid,
wherein the drilling fluid is an invert emulsion; and
wherein the oil absorbent material is a polymer selected from the group consisting of: styrene butadiene acrylate, styrene butadiene acrylate carbonate, a polymer comprising phthalate, a polymer comprising a fluorinated ether block amide, and a polymer comprising a perfluorinated ether block amide.

2. The method of claim 1 wherein the oil absorbent material increases low end rheological properties of the drilling fluid.

3. The method of claim 1 wherein the oil absorbent material is a viscosifier to the drilling fluid.

4. The method of claim 1 wherein the oil absorbent material enhances suspension properties of the drilling fluid.

5. The method of claim 1 wherein the oil absorbent material is a filtration control agent in the drilling fluid.

6. The method of claim 1 wherein the drilling fluid comprises at least one base oil selected from the group consisting of: a linear base oil, a cyclic base oil, an aliphatic base oil, an aromatic base oil, an olefinic base oil, and an esterified base oil.

7. The method of claim 1 wherein the viscosity of the drilling fluid increases with the quantity of oil absorbent material added thereto.

8. A method for modifying or enhancing one or more rheological properties of an oil-based drilling fluid for drilling a wellbore in a subterranean formation while also preventing lost circulation during the drilling, the method comprising adding to the drilling fluid during drilling an additive consisting of an oil absorbent material and continuing drilling with the drilling fluid; wherein the drilling fluid is an invert emulsion and wherein the oil absorbent material is a polymer selected from the group consisting of: styrene butadiene acrylate, styrene butadiene acrylate carbonate, a polymer comprising phthalate, a polymer comprising a fluorinated ether block amide, and a polymer comprising a perfluorinated ether block amide.

9. The method of claim 8 wherein the oil absorbent material increases the bonding strength during cementing of the wellbore.

10. A method for treating a wellbore in subterranean formation containing an oil comprising:
introducing an oil absorbent material into the wellbore, wherein the oil absorbent material is a polymer selected from the group consisting of: styrene butadiene acrylate, styrene butadiene acrylate carbonate, a polymer comprising phthalate, a polymer comprising a fluorinated ether block amide, and a polymer comprising a perfluorinated ether block amide;
allowing the oil absorbent material to absorb at least a portion of the oil in the wellbore; and
introducing cement into the wellbore after allowing the oil absorbent material to absorb at least the portion of the oil in the wellbore.

11. The method of claim 10 wherein the oil absorbent material increases the bonding strength of the cement.

* * * * *